No. 626,515. Patented June 6, 1899.
C. WHITNEY.
ANTIFRICTION GEARING.
(Application filed Mar. 8, 1899.)
(No Model.)
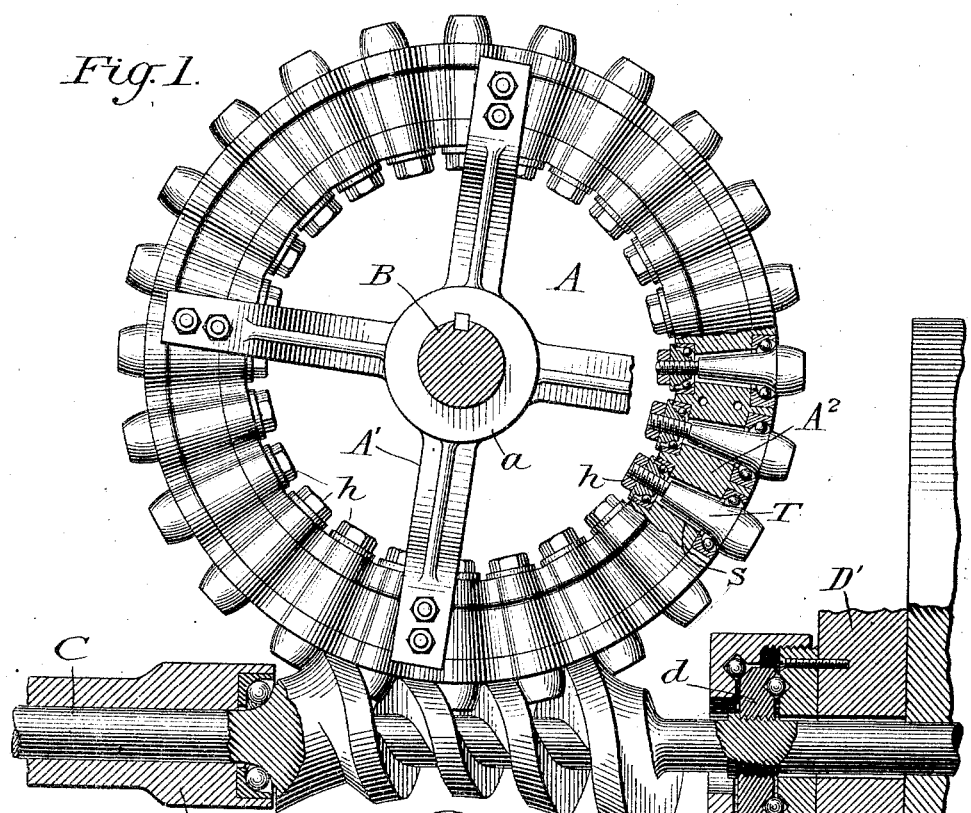
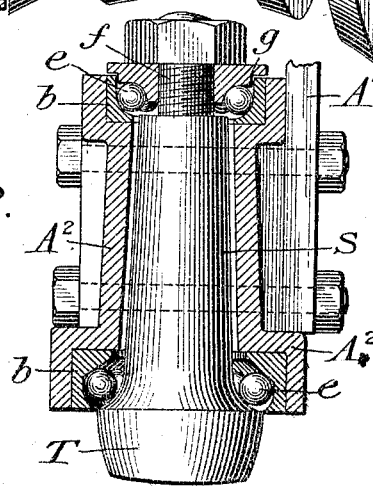
Witnesses.
Inventor.
Charles Whitney
By his attorneys

UNITED STATES PATENT OFFICE.

CHARLES WHITNEY, OF WINNETKA, ILLINOIS.

ANTIFRICTION-GEARING.

SPECIFICATION forming part of Letters Patent No. 626,515, dated June 6, 1899.

Application filed March 8, 1899. Serial No. 708,264. (No model.)

*To all whom it may concern:*

Be it known that I, CHARLES WHITNEY, a citizen of the United States, residing at Winnetka, in the county of Cook and State of Illinois, have invented certain new and useful Improvements in Antifriction-Gearing; and I do hereby declare the following to be a full, clear, and exact description of the invention, such as will enable others skilled in the art to which it appertains to make and use the same.

The invention relates to gearing generally, and though it has been designed with particular reference to mowing and reaping machinery it is adapted for use in a variety of machines and it is not intended in the present application to restrict its adaptation to any particular class of machines.

The object of the invention, generally speaking, is to produce an arrangement of gearing that will be as nearly frictionless as possible, and it is generally characteristic of the invention that I substitute a rolling contact between the intermeshing parts for the usual sliding contact. This of itself considerably reduces the friction, and though I do not pretend that the broad idea of a rolling contact is new the rotary pin-tooth form in which I have embodied the same enables me to obtain a very much greater diminution in the amount of friction than in any other construction heretofore known to me.

The invention is illustrated in the accompanying drawings, wherein—

Figure 1 is an elevation, partly in section, of a driving-gear and worm arrangement embodying my improvements; and Fig. 2 is a sectional detail of one of the pin roller-teeth and its connection with the wheel.

I will now describe the construction illustrated in the drawings and claim what are regarded as its novel features.

Referring first to Fig. 1, A denotes a spur driving-gear, and B any suitable shaft to which it is secured. In this instance the shaft B is the axle of a mowing-machine, and C is the shaft for driving the reciprocating knife or cutter. D and D' are bearings for the shaft C, and E is a balance-wheel on the end of the shaft. The shaft C is driven from the wheel A through the intermediacy of a worm F, secured on or formed with the shaft, the spiral of the worm preferably varying in depth from the center toward its ends in such degree as to conform to the periphery of the gear A.

The shaft C is shown provided with ball-bearings at opposite ends of the worm, and these bearings are arranged to take the end thrust of the shaft and to support the shaft itself. One of these bearings, preferably the one at the balance-wheel end of the shaft, is made adjustable by means of a disk $d$ screwing upon a thread on the shaft and having an annular ball-race in one face and a chamfered or beveled edge on the other face.

The bearing D is provided with a ball-race coincident with the one in the face of the disk, and a cap or cover $c$ screws onto the bearing and has an annular ball-race coinciding with the race formed by the beveled edge of the opposite side of the disk. Antifriction-balls of appropriate size run in these races, and either or both sets of balls may be tightened or loosened by adjusting the disk and cap.

In the present illustration of the invention the wheel A is the driver, as before stated; but it may as well be driven by the worm F, or, for that matter, by any other form of driving-gear. The wheel shown is also a spur-gear and the teeth project from its front face or periphery. It may, however, be a bevel-gear or a crown-gear and have the teeth project from its side face; but whatever the type of wheel a characteristic feature will be that the teeth are solid roller-pins having their shanks inclosed in antifriction ball-bearings and their outer ends projecting freely from the face of the wheel in contradistinction to fixed pins that are rooted in the wheel and merely have antifriction-caps, which latter constitute the working portion of the teeth.

The construction of the wheel is as follows: A' is a strong stout spider whose hub $a$ is keyed or otherwise secured to the shaft B and whose arms project radially outward a distance determined by the diameter of the wheel. $A^2$ is an annular rim which is securely bolted or otherwise fastened to the spider-arms and in which are formed the seats for the roller-pins. This is the preferable construction of what may be called the "frame" of the wheel; but obviously it need not be of skeleton form, nor need the rim be separate from the center portion.

The teeth are denoted by the letter T. They are in the form of solid pins of a length considerably elongated in respect of the extent of their working portion and having their elongated shanks preferably conical in form. I do not desire to be confined to any particular form for the working portion of the teeth, but prefer the conoidal convex form shown in the drawings. The thickness of the rim will be proportioned to the size and power of the wheel, and it will be of such width as to provide a considerable distance between the bearing-points of the teeth. The rim is preferably a solid casting and is formed with radial sockets S, extending through from its outer to its inner face and forming open-ended seats for the teeth. The outer and inner ends of these sockets are provided with angular recesses in which are located annular races $b$ for rows of antifriction-balls $e$.

As before stated, the shank portions of the pins T are considerably longer than the tooth portions. The object of this elongation of the bearing parts of the teeth is to strengthen and steady their movements, and the advantage of it will be apparent on considering the fact that the teeth do not completely fill the sockets and that there is a consequent tendency for them to be deflected, turning on the outer row of balls as a pivot. This tendency is commensurate with the force exerted on the teeth, and by elongating the shanks and locating the inner row of balls as far as practicable from the outer I get a sufficient leverage on the teeth to effectually resist this lateral thrust and at the same time equalize the strains on the balls.

The conicality of the shank portions of the teeth increases abruptly about where they join the head or working portions, thereby forming overhangs which practically fill the orifices of the outer ends of the sockets and confine the balls to their races, as well as protecting the bearings against the entrance of dust, dirt, &c. The shoulder thus formed on the teeth constitutes a bearing-surface for the balls that is integral with the teeth, which is a desirable though not essential feature.

The teeth project clear through the sockets in the rim and terminate at their inner ends in threaded portions $f$, upon which are screwed nuts $h$. These nuts are readily accessible from the inner periphery of the rim and constitute the means for holding the teeth in the sockets. Underneath the nuts $n$ there are slipped over the ends of the tooth-shanks cone-washers $g$, which, with the ball-races at that end of the sockets, complete the bearings at the inner ends of the teeth. These washers are held in place by the nuts $h$ and are readily adjustable by screwing and unscrewing the nuts, which act also serves to adjust both bearings by forcing the teeth and the washers $g$ in opposite directions.

Such being the construction and arrangement of my improved antifriction-gearing its operation will be understood without explanation further than to say that on the rotation of the wheel A the roller pin-teeth are pressed against the worm, causing it and the shaft C to rotate, and that the teeth revolve bodily in their bearings as they roll along the surface of the worm-spiral, thereby diminishing the friction to the lowest attainable point. The varying depth of the worm-spiral has the advantage of greatly increasing the amount of contact-surface between the wheel and the worm, because the teeth take hold of the worm sooner and let go later and because more of them are engaged with it at a time than were the spirals of uniform depth.

Having thus described my invention, what I claim, and desire to secure by Letters Patent, is—

1. A gear-wheel, having tooth-sockets, antifriction ball-bearings seated in the same, and teeth composed of axially-rotatable solid pins that are inclosed in said bearings and have their free ends projecting from the wheel's face.

2. A gear-wheel, composed of an annular rim having tooth-sockets extending through the same, antifriction ball-bearings seated in said sockets and axially-rotatable solid pin-teeth, said pins being inclosed in said bearings and having their free ends projecting radially from the periphery of the wheel.

3. A gear-wheel, composed of an annular rim having open-ended radial tooth-sockets extending through the same, antifriction ball-bearings seated in opposite ends of said sockets, and axially-rotatable solid pin-teeth inclosed in said bearings, the free outer ends of the teeth projecting radially from the periphery of the rim, and having means at their opposite ends for adjusting the bearings.

4. A gear-wheel, composed of an annular rim having open-ended radial tooth-sockets extending through the same, antifriction ball-bearings seated in opposite ends of said sockets, axially-rotatable solid pin-teeth inclosed in said bearings and having their free ends projecting radially outward from the periphery of the rim, and means at the opposite ends of the teeth and accessible from the inner periphery of the rim for detachably holding the teeth in their sockets and adjusting the bearings.

5. A gear-wheel, composed of an annular rim having tooth-sockets formed therein, antifriction ball-bearings seated in the outer ends of said sockets, and roller pin-teeth inclosed in said bearings and having overhangs or shoulders closing the outer ends of the tooth-sockets and protecting the bearings.

6. A gear-wheel, composed of an annular rim having open-ended tooth-sockets extending therethrough, antifriction ball-bearings seated in said sockets, roller pin-teeth inclosed in said bearings and having overhangs or shoulders closing the outer ends of the sockets and protecting the bearings, adjustable caps or washers on the inner ends of the teeth closing the opposite ends of the sockets and serving to adjust and protect the bearings.

CHARLES WHITNEY.

Witnesses:
ALBIN R. PETERSON,
MARVIN CRAMER.